(12) United States Patent
Wou

(10) Patent No.: US 11,247,717 B2
(45) Date of Patent: Feb. 15, 2022

(54) ELECTRIC POWER ASSIST STEERING ASSEMBLY

(71) Applicant: Ford Global Technologies, LLC, Dearborn, MI (US)

(72) Inventor: Soungjin Wou, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 339 days.

(21) Appl. No.: 16/244,415

(22) Filed: Jan. 10, 2019

(65) Prior Publication Data
US 2019/0344822 A1 Nov. 14, 2019

Related U.S. Application Data

(60) Provisional application No. 62/670,461, filed on May 11, 2018.

(51) Int. Cl.
*B62D 5/04* (2006.01)
*H02K 7/10* (2006.01)
*F16H 55/36* (2006.01)

(52) U.S. Cl.
CPC .......... *B62D 5/0406* (2013.01); *B62D 5/046* (2013.01); *F16H 55/36* (2013.01); *H02K 7/1004* (2013.01)

(58) Field of Classification Search
CPC ......... B62D 5/0406; B62D 5/046; F16H 7/08; F16H 7/10
See application file for complete search history.

(56) References Cited

U.S. PATENT DOCUMENTS

| | | | |
|---|---|---|---|
| 7,360,624 B2 * | 4/2008 | Nagamatsu | B62D 5/0424 180/444 |
| 7,490,696 B2 | 2/2009 | Saruwatari et al. | |
| 7,510,045 B2 | 3/2009 | Bareis et al. | |
| 7,823,687 B2 * | 11/2010 | Spengler | F16H 7/08 180/444 |
| 9,004,222 B2 * | 4/2015 | Kaneko | B62D 5/0448 180/444 |
| 9,327,758 B2 * | 5/2016 | Watanabe | B62D 5/0448 |
| 9,802,641 B2 * | 10/2017 | Tomikawa | F16H 7/02 |
| 10,017,204 B2 * | 7/2018 | Kim | B62D 5/0403 |
| 2005/0133297 A1 * | 6/2005 | Chikaraishi | F16H 7/023 180/444 |
| 2005/0247514 A1 | 11/2005 | Heitzer | |

(Continued)

FOREIGN PATENT DOCUMENTS

| | | | | |
|---|---|---|---|---|
| CN | 203176276 U | 9/2013 | | |
| DE | 19544755 C2 * | 5/2001 | | B62D 6/10 |

(Continued)

*Primary Examiner* — Minnah L Seoh
*Assistant Examiner* — Maurice L Williams
(74) *Attorney, Agent, or Firm* — Raymond L. Coppiellie; Bejin Bieneman PLC

(57) ABSTRACT

A power steering assembly includes a housing having a first hole on a first axis. The power steering assembly includes a cartridge in the first hole and having a second hole and a third hole that are both centered on a second axis that is parallel with and spaced from the first axis. The power steering assembly includes a pulley supported by the second hole and the third hole. The power steering assembly includes a motor releasably fixed to the cartridge and operatively coupled to the pulley.

20 Claims, 6 Drawing Sheets

(56) References Cited

U.S. PATENT DOCUMENTS

| | | | | |
|---|---|---|---|---|
| 2006/0076181 A1* | 4/2006 | Murakami | ........... | B62D 5/0424 |
| | | | | 180/443 |
| 2007/0095600 A1* | 5/2007 | Jo | ........................ | B62D 5/0424 |
| | | | | 180/444 |
| 2016/0311463 A1* | 10/2016 | Morinaga | ................ | F16H 37/12 |
| 2017/0248204 A1* | 8/2017 | Simmons | .............. | F16H 7/0838 |

FOREIGN PATENT DOCUMENTS

| | | | | | |
|---|---|---|---|---|---|
| EP | 2409896 A2 * | 1/2012 | | ........... | B62D 5/0424 |
| JP | 2005343434 A | 12/2005 | | | |
| WO | WO-2004018279 A1 * | 3/2004 | | ................ | F16H 7/14 |

* cited by examiner

ELECTRIC POWER ASSIST STEERING ASSEMBLY

CROSS-REFERENCE TO RELATED APPLICATION

The subject patent application claims priority to and all the benefits of U.S. Provisional Patent Application No. 62/670,461 filed on May 11, 2018, which is herein incorporated by reference in its entirety.

BACKGROUND

A vehicle includes a steering system. The steering system may be a rack-and-pinion steering system, which includes a rack that connects to two front wheels the vehicle to steer the vehicle. The steering system includes a steering wheel and a steering column that transmits user input from the steering wheel to the rack, e.g., through a pinion.

The steering system may include a column-mounted or rack-mounted electric power assisted steering (EPAS) assembly. The EPAS assembly assists in steering and provides electric power to aid in movement of the rack such that a driver is able to use less effort to turn the steering wheel.

DETAILED DESCRIPTION

Figure 1:
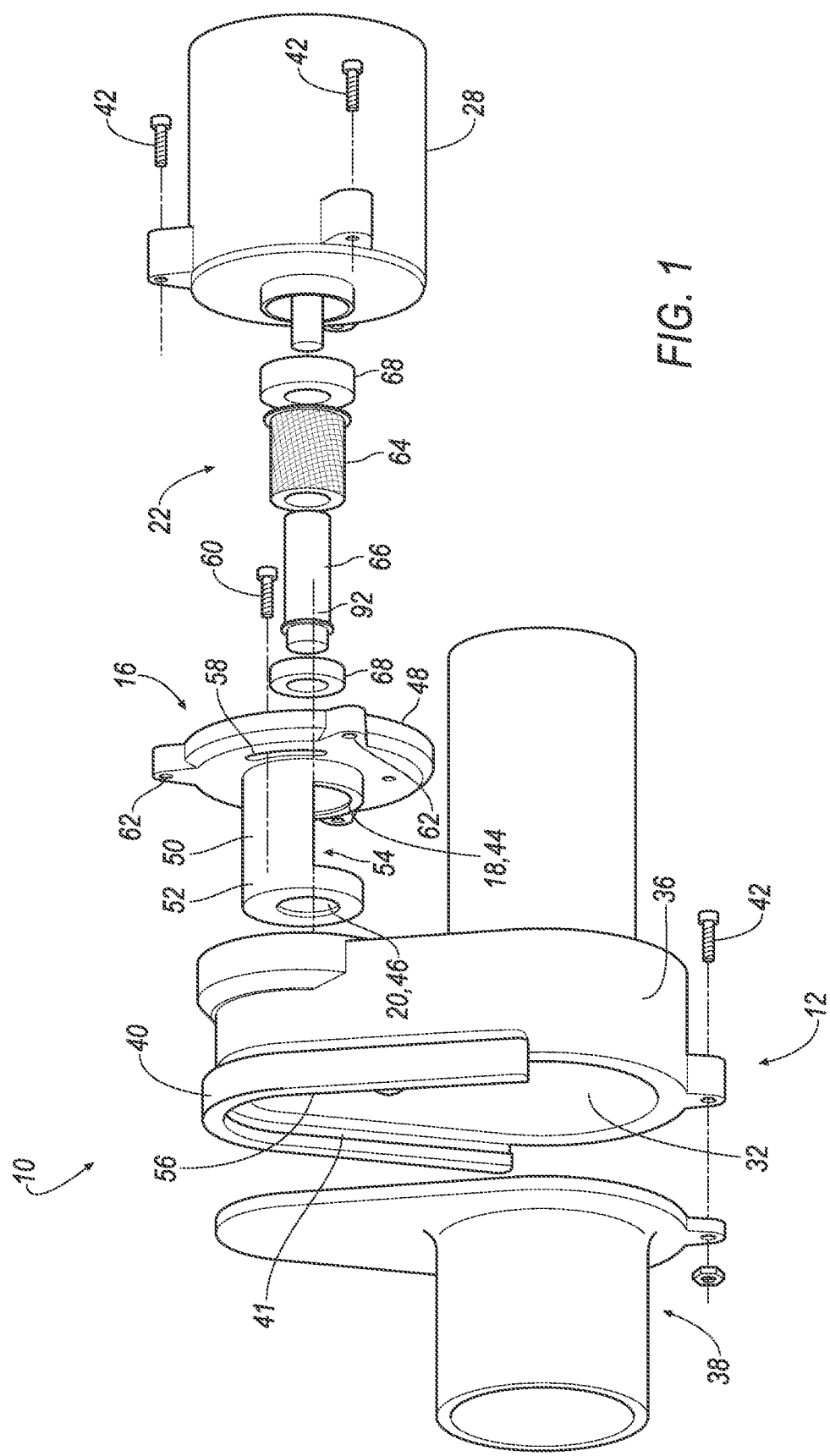
FIG. 1 is a perceptive view of an exploded view of an electric power steering assembly.

A power steering assembly includes a housing having a first hole on a first axis. The power steering assembly includes a cartridge in the first hole and having a second hole and a third hole that are both centered on a second axis that is parallel with and spaced from the first axis. The power steering assembly includes a pulley supported by the second hole and the third hole. The power steering assembly includes a motor releasably fixed to the cartridge and operatively coupled to the pulley.

The cartridge may include slots each extending along a circular arc about the first hole, and the cartridge may be connected to the housing through the slots.

The power steering assembly may include fasteners extending through the slots and fixing the cartridge to the housing.

The cartridge may include a base and an extension extending from the base, the slots extending through the base, the third hole extending through the extension.

The cartridge may include a base and an extension extending from the base, the extension having a cylindrical outer surface spaced from the base.

The extension may include a cutout, and the power steering assembly may include a belt extending through the cutout and engaged with the pulley.

The housing may include a first part having a passage elongated along a third axis, and a second part having a second passage elongated along the third axis.

The housing may include a first part having a lip defining a channel, and a second part disposed in the channel.

The power steering assembly may include a mechanical clutch between the motor and the pulley.

The mechanical clutch may include a first clutch plate rotationally fixed relative to the pulley, a second clutch plate rotationally fixed relative to the motor, and a spring biasing one of the first and second clutch plates toward the other of the first and second clutch plates.

The pulley may have a splined bore and the mechanical clutch may include a splined shaft engaged with and axially slidable along the splined bore, the splined shaft being fixed to the first clutch plate, and the spring being in the splined bore and biasing the first clutch plate toward the second clutch plate.

The housing may include a first part defining the first hole and a second part having a belt guide.

The first part and the second part may be sealed to each other.

The power steering assembly may include a rack operatively coupled to the pulley.

The power steering assembly may include a belt operatively coupling the rack to the pulley.

A cartridge includes a base having slots extending through the base and along a circular arc about a first axis. The cartridge includes an extension extending from the base and having an outer surface coaxial with the first axis. The cartridge includes a first hole in the base and a second hole in the extension, the first hole and the second hole coaxial on a second axis parallel with and spaced from the first axis.

The extension may include a cutout between the first hole and the second hole.

The outer surface may include a cylindrical portion spaced from the base.

The base may include a hole spaced from the first axis and the second axis.

With reference to the Figures, wherein like numerals indicate like parts throughout the several views, an electric power steering assembly 10 for a vehicle (not shown) is generally shown. The assembly 10 may also be referred to as an electric power assist steering assembly (EPAS). The assembly 10 includes a housing 12 having a first circular hole 14 on a first axis 90. The assembly 10 includes a cartridge 16 engaging the housing 12 in the first circular hole 14. The cartridge 16 has a second circular hole 18 and a third circular hole 20 that are coaxial and both centered on a second axis 92. The second axis 92 is parallel with and spaced from the first axis 90. The assembly 10 includes a pulley 22 engaged with both the second circular hole 18 and the third circular hole 20.

Figure 2:
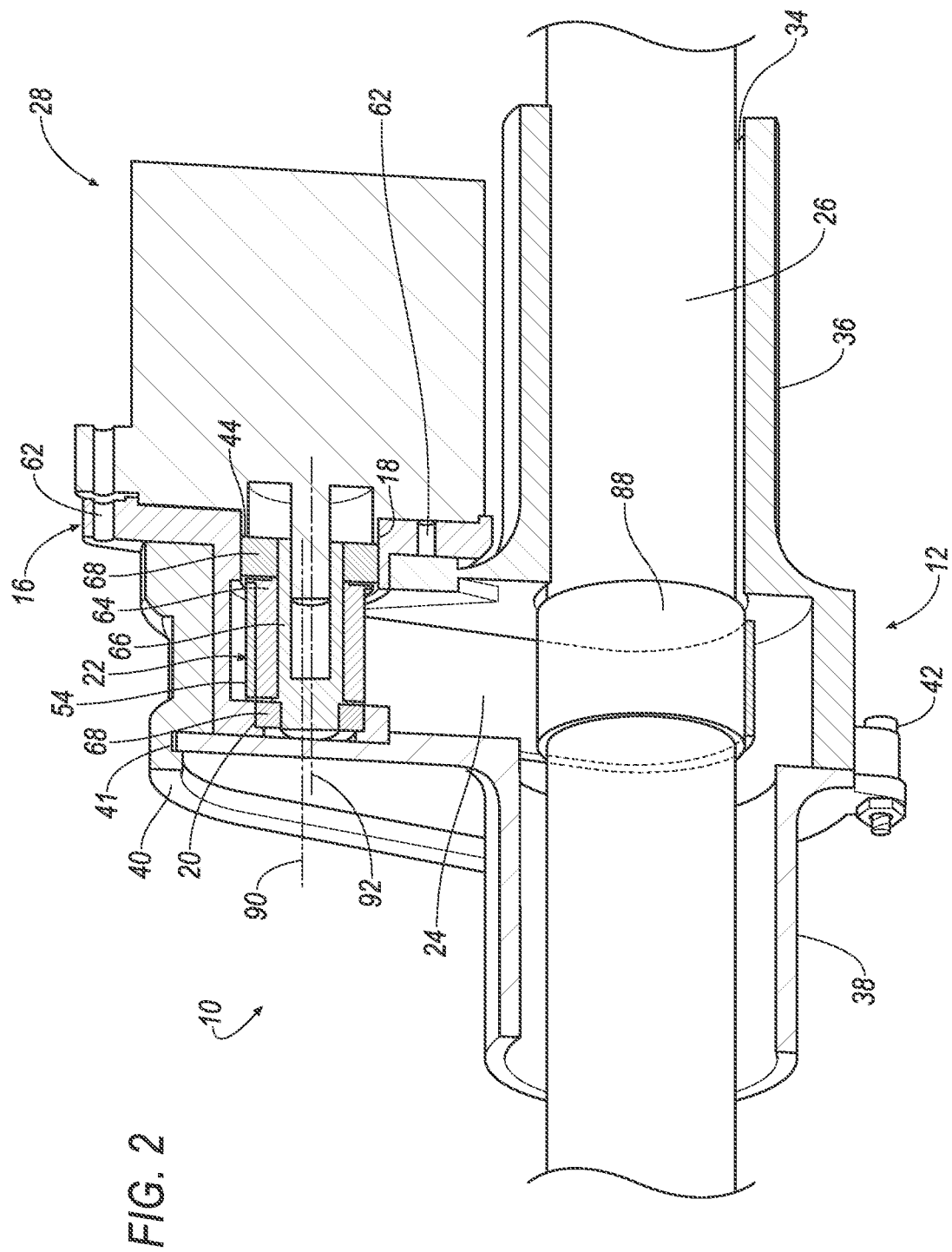
FIG. 2 is a front cross section of the electric power steering assembly.
Figure 4:
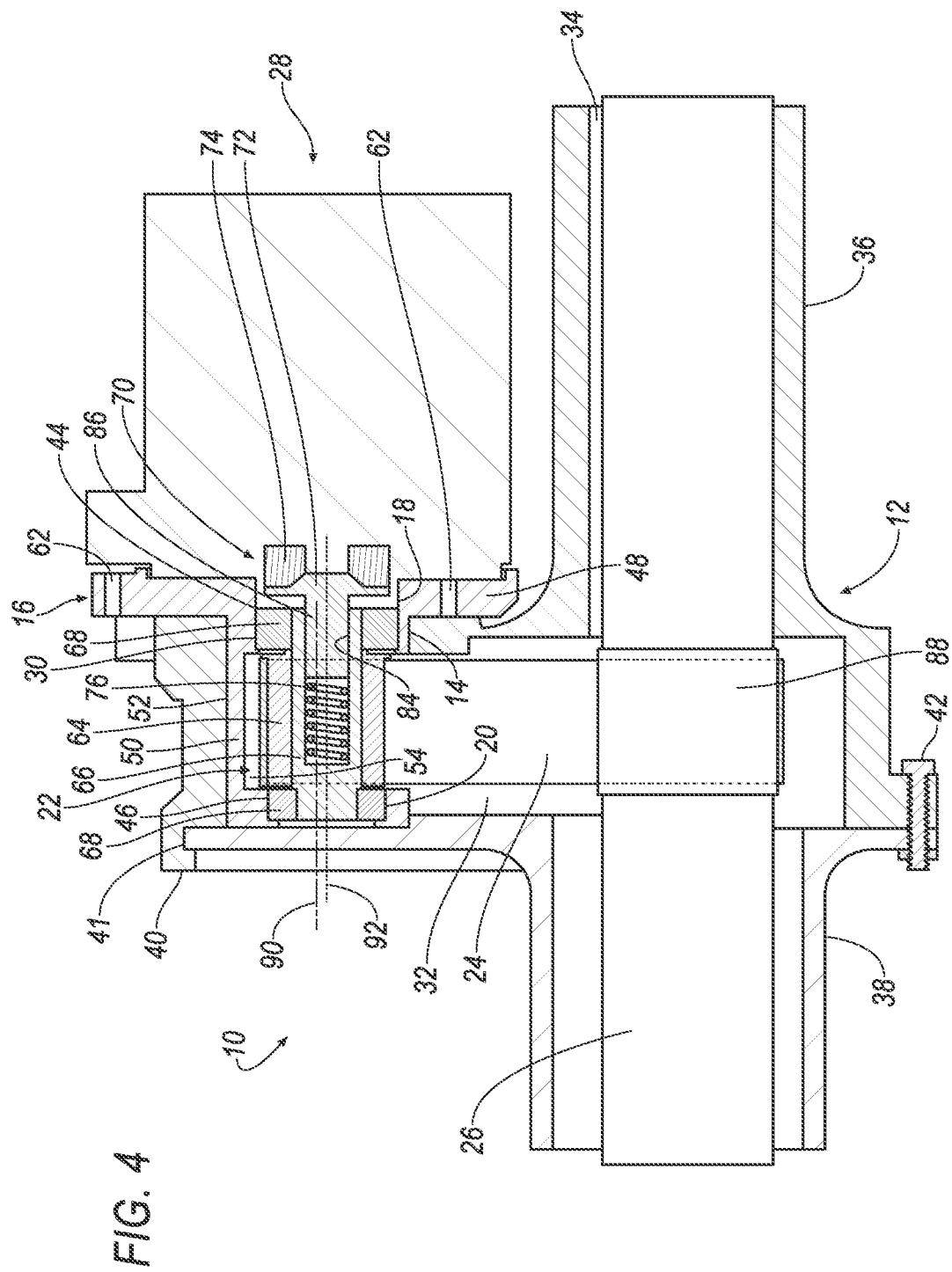
FIG. 4 is a front cross section of the electric power steering assembly of FIG. 3.
Figure 5:
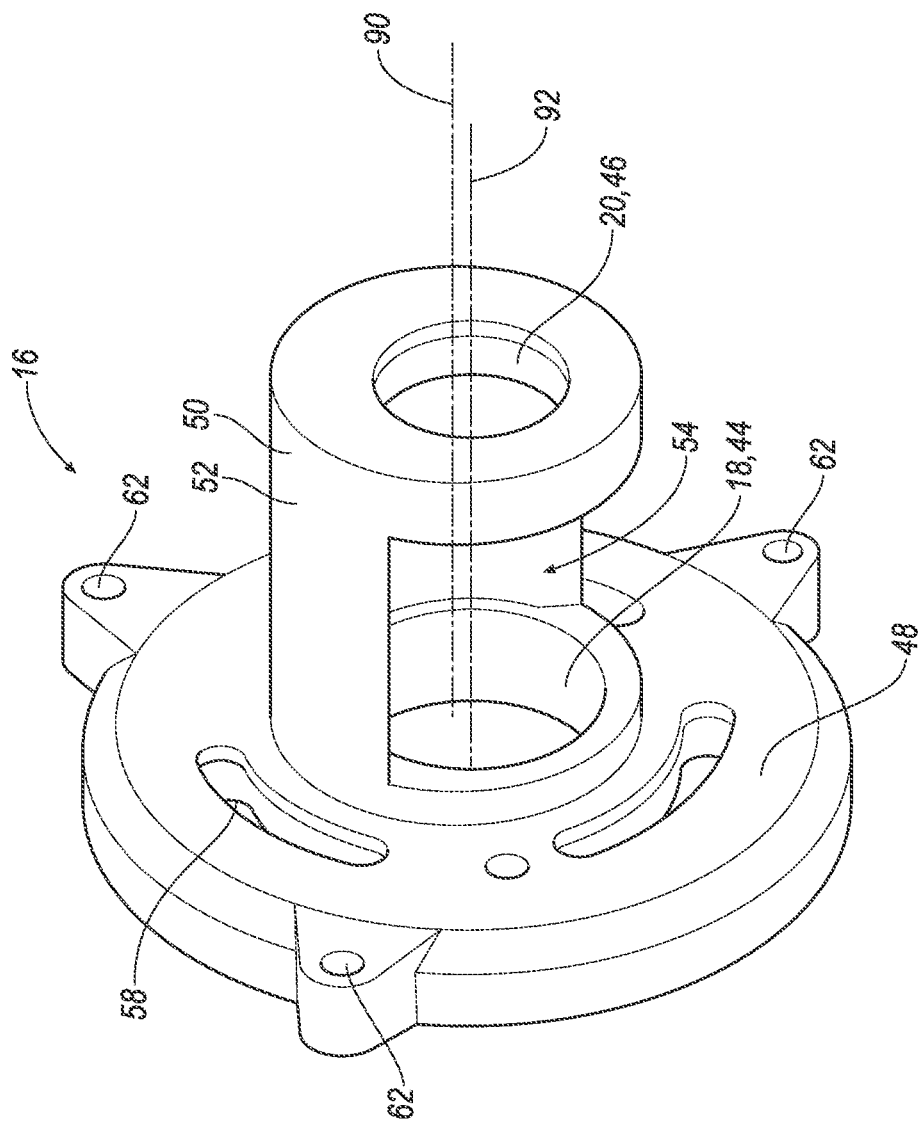
FIG. 5 is a perspective view of a cartridge of the electric power steering assembly of FIGS. 1 and 3.
Figure 6:
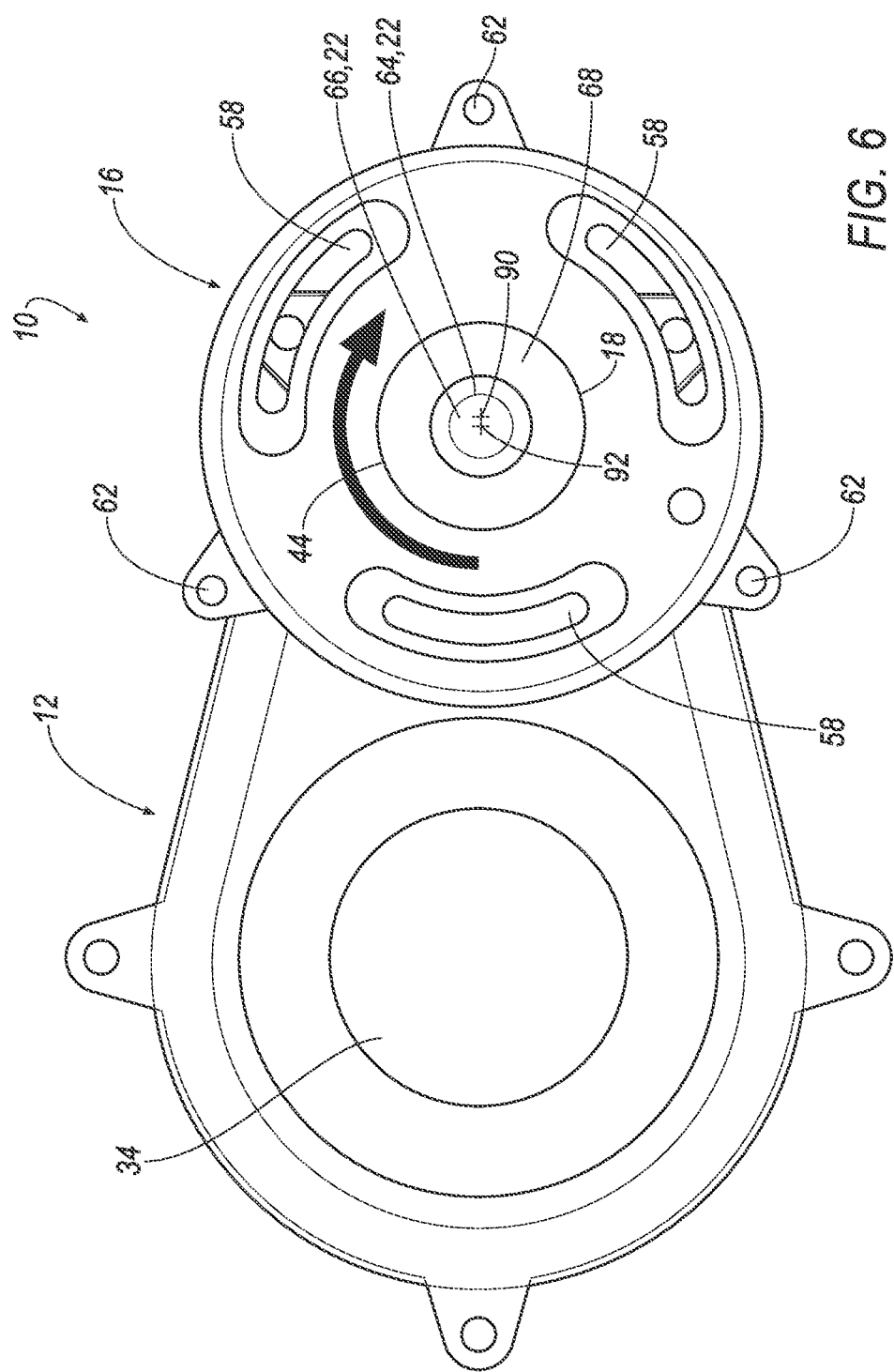
FIG. 6 is a side view of the electric power steering assembly of FIGS. 1 and 3.

As set forth further below and as shown in FIGS. 2 and 4, a belt 24 engages the pulley 22 with a rack 26 of a steering system (not shown), e.g., a rack-and-pinion steering system. As shown in FIG. 6, the cartridge 16 may be twisted relative to the housing 12 and about the first axis 90 to adjust the tension in the belt 24, e.g., at an assembly facility before installation into a vehicle. In particular, since the pulley 22 is engaged with the second circular hole 18 and the third circular hole 20, both of which are centered on the second axis 92, the pulley 22 is also centered on the second axis 92. Accordingly, rotation of the cartridge 16 about the first axis 90 results in eccentric rotation of the pulley 22 relative to the first circular hole 14. This eccentric rotation of the pulley 22 tightens or loosens the belt 24. As described further below and as shown in the Figures, the cartridge 16 is fixed relative to the housing 12, e.g., at an assembly facility, when a desired tension in the belt 24 is achieved to maintain the tension in the belt 24 for the life of the assembly 10.

The steering system includes the assembly 10. As set forth above, the steering system may be a rack-and-pinion steering system, or alternatively, could be any suitable type of steering system. The steering system may include the rack 26. The rack 26 may connect to wheels (not shown) of the vehicle, e.g. two front wheels of the vehicle, to steer the vehicle. The steering system may include a steering wheel (not shown) and a steering column (not shown) that transmits user input from the steering wheel to the rack 26 through a pinion (not shown).

The assembly 10 is engaged with the rack 26 to assist in movement of the rack 26 by the pinion. This reduces the magnitude of the force required to turn the steering wheel. Specifically, the assembly 10 includes a motor 28 that drives the pulley 22, as described further below.

As shown in FIGS. 2 and 4, the pulley 22 is engaged with the rack 26. As one example, the rack 26 may include a ball screw section (not shown), and a ball nut assembly 88 is engaged with the ball screw section. The ball nut assembly 88 includes a ball nut (not shown) and the belt 24 engages the pulley 22 with the ball nut such that rotation of the pulley 22 is transmitted to the ball nut. The ball nut assembly 88 includes balls housed by the ball nut, as is known. In the alternative to the ball nut assembly 88, any suitable device may be engaged with the belt 24 and the rack 26 to transfer rotation of the belt 24 into translation of the rack 26.

The housing 12 includes the first circular hole 14. The first circular hole 14 is on the first axis 90. In other words, the first axis 90 is at the center of the first circular hole 14, i.e., the first circular hole 14 is centered on the first axis 90. The first circular hole 14 is "circular" in that the first circular hole 14 has a circular cross-section. As one example, the first circular hole 14 may be at a first cylindrical bore 30. In such an example, the first axis 90 is the geometric axis of the cylindrical shape of the first cylindrical bore 30. The first cylindrical bore 30 may be partially cylindrical.

As shown in FIGS. 2 and 4, the housing 12 has a cavity 32 that houses the pulley 22 and the belt 24. The housing 12 includes a through-bore 34 that extends into the cavity 32 and receives the rack 26. Specifically, in the embodiment including the ball nut assembly 88, the through-bore 34 receives the ball screw section of the rack 26.

The housing 12 may include a first part 36 and a second part 38 that are connected together. For example, the first part 36 may include a lip 40, and the second part 38 may be received in the lip 40, e.g., may be slip into the lip 40, to retain the first and second parts 36, 38 together. For example, the lip 40 may extend about a perimeter of the first part 36, e.g., at a distal edge of the first part 36 and perpendicular to the axes 90, 92. The lip 40 may extend along the perimeter from the through-bore 34 and around the first circular hole 14. The lip 40 may define a channel 41. The second part 38 may be in the channel 41 with the lip 40 surroundings an edge of the second part 38 restricting movement of the first part 36 relative to the second part 38 in a plurality of directions.

A fastener 42 may engage both the first part 36 and the second part 38. Alternately or additionally, the first part 36 and the second part 38 may be fixed to each other with a plurality of fasteners. In any event, the first part 36 and the second part 38 may be sealed around the entire periphery of the cavity 32. The first part 36 and the second part 38 may be sealed in any suitable fashion, e.g., with a sealant, an adhesive, a bonding agent, sonic welding, a gasket, etc.

The housing 12 may include a belt guide 37. The belt guide 37 positions the belt 24 within the housing 12. The belt guide 37 may extend from the second part 38 between the pulley 22 and the rack 26 towards a center of the cavity 32. The belt 24 may surround the belt guide 37.

The cartridge 16 includes the second circular hole 18 and the third circular hole 20. The second circular hole 18 and the third circular hole 20 are both on the second axis 92. In other words, the second axis 92 is at the center of the second circular hole 18 and the third circular hole 20, i.e., the second circular hole 18 and the third circular hole 20 are both centered on the second axis 92. The second circular hole 18 and the third circular hole 20 are "circular" in that the second circular hole 18 and the third circular hole 20 each have a circular cross-section perpendicular to the second axis 92. As one example, the second circular hole 18 may be at a second cylindrical bore 44. In such an example, the second axis 92 is the geometric axis of the cylindrical shape of the second cylindrical bore 44. The third circular hole 20 may be at a third cylindrical bore 46. In such an example, the second axis 92 is the geometric axis of the cylindrical shape of the third cylindrical bore 46.

The cartridge 16 includes a base 48 and an extension 50 extending from the base 48. The base 48 extends circumferentially around the extension 50. In the example shown in the Figures, the base 48 is circular and is on the first axis 90, which is parallel to and spaced from the second axis 92. The second circular hole 18 extends through the base 48, and the third circular hole 20 extends through the extension 50.

The extension 50 is elongated from the base 48 along the second axis 92. The extension 50 has a cylindrical outer surface 52 on the first axis 90. The cylindrical outer surface 52 is coaxial with the first circular hole 14. The cylindrical outer surface 52 may be partially cylindrical. For example, the cylindrical outer surface 52 may have a belt cutout 54 through which the belt 24 extends.

The cylindrical outer surface 52 abuts the first circular hole 14, e.g., around the circumference of the cylindrical outer surface 52. The first circular hole 14 receives the cylindrical outer surface 52 of the extension 50. Specifically, in the example shown in the Figures, the first cylindrical bore 30 of the housing 12 receives the cylindrical outer surface 52 of the extension 50. The first cylindrical bore 30 and the cylindrical outer surface 52 may be slide-fit, i.e., with minimum clearance between the cylindrical outer surface 52 and the first cylindrical bore 30 to allow for free movement between the cylindrical outer surface 52 and the first cylindrical bore 30 without play.

The cartridge 16 includes slots 58 extending through the base 48. The slots 58 each extend along a common circular arc, i.e., each of the slots 58 are on the same circular arc. The circular arc of the slots 58 is coaxial with the first circular hole 14. The cartridge 16 is connected to the housing 12 through the slots 58. For example, threaded fasteners may extend through the slots 58 and engage the cartridge 16 to the housing 12. Before adjustment, the threaded fasteners may be loose to allow rotation of the cartridge 16 relative to the housing 12 about the first axis 90. After the cartridge 16 is rotated about the first axis 90 to achieve the desired tension in the belt 24 the threaded fasteners 60 may be tightened to fix the cartridge 16 to the housing 12 and maintain the tension in the belt 24. The cartridge 16 may include any suitable number of slots 58. As an example, the cartridge 16 includes two slots 58. As another example, the cartridge may include three slots (not shown).

The motor 28 is removably fixed to the base 48 of the cartridge 16. In other words, the motor 28 and/or the base 48 are designed such that the motor 28 may be removed from the base 48 without damaging the base 48 and without moving the cartridge 16 relative to the housing 12. Accordingly, in a scenario where it is desirable to remove the motor 28, e.g., for service or replacement, the motor 28 may be removed from the base 48 and a new motor 28 may be removably fixed to the base 48. During this replacement of the motor 28, the pulley 22 remains in position relative to the housing 12 such that the tension in the belt 24 is maintained. As an example, the base 48 may include holes 62 and the motor 28 may be connected to the base 48 with fasteners. As another example, the holes 62 and/or corresponding holes in the motor 28 may be threaded. Alternatively, the motor 28 may be removably fixed to the cartridge 16 in any suitable fashion.

The pulley 22 is operatively engaged with the motor 28, i.e., torque from the motor 28 drives the pulley 22 to rotate the belt 24. The pulley 22 may be a single piece or may include multiple components. In the example shown in the Figures, the pulley 22 includes a head 64 and a shaft 66 fixed to the head 64. The shaft 66 is driven by the motor 28 and rotates the head 64. The head 64 of the pulley 22 may include features for engaging and driving the belt 24, e.g., teeth.

The second hole 18 and the third hole 20 of the cartridge 16 support the pulley 22. Specifically, the shaft 66 may be disposed within the second circular hole 18 and the third circular hole 20, and the head 64 of the pulley 22 may be disposed between the second circular hole 18 and the third circular hole 20. The belt 24 engages the head 64 between the second circular hole 18 and the third circular hole 20. This support reduces stress on the pulley 22 and increases the life of the pulley 22. Bearings 68, for example, may support the shaft 66 of the pulley 22 at the second circular hole 18 and the third circular hole 20, e.g., the bearings 68 may be engaged with the second cylindrical bore 44 and the third cylindrical bore 46.

The belt 24 may be of any suitable type for transmitting rotation from the pulley 22 to the rack 26, e.g., to the ball nut. The belt 24 may include teeth designed to, i.e., sized, shaped, spaced, etc., engage both the pulley 22 and the ball nut to transmit rotation from the pulley 22 to the ball nut. The belt 24 may be of any suitable material, e.g., a flexible fiber-reinforced polymer.

The motor 28 is operatively engaged with the pulley 22. The motor 28 may be an electric motor, a brushless motor, a servomotor, a stepper motor, a hydraulic motor, or any suitable torque generating structure.

Figure 3:
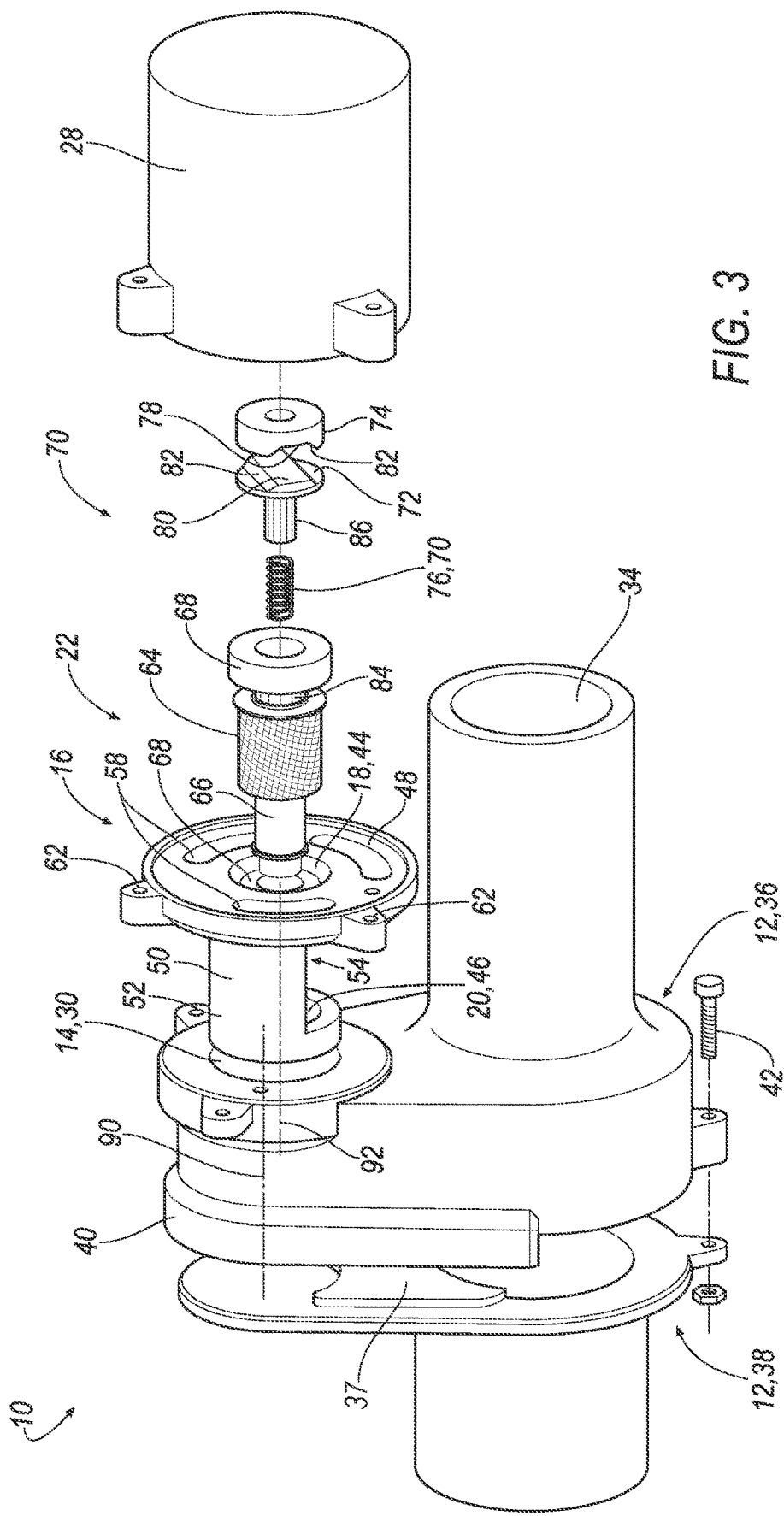
FIG. 3 is a perceptive view of an exploded view of another electric power steering assembly.

With reference to FIGS. 3 and 4, the assembly 10 may include a mechanical clutch 70. The mechanical clutch 70 is between the motor 28 and the pulley 22, and allows relative rotation between the motor 28 and the pulley 22 when torque required to turn the pulley 22 exceeds a threshold. Specifically, the mechanical clutch 70 is between the motor 28 and the shaft 66 of the pulley 22.

The mechanical clutch 70 may include a first clutch plate 72, a second clutch plate 74, and a spring 76. The first clutch plate 72 is rotationally fixed to the pulley 22, i.e., to inhibit relative rotation therebetween. The second clutch plate 74 is rotationally fixed to the motor 28.

The mechanical clutch 70 is designed to transmit rotation from the second clutch plate 74 to the first clutch plate 72 when torque required to turn the pulley 22 is below the threshold, and to allow the first clutch plate 72 and the second clutch plate 74 to slip, i.e., allows the second clutch plate 74 to rotate relative to the first clutch plate 72, when torque required to turn the pulley 22 is above the threshold. The first clutch plate 72 and the second clutch plate 74 are designed to releasably engage each other.

For example, one of the first clutch plate 72 and the second clutch plate 74 has a groove 78 and the other of the first clutch plate 72 and the second clutch plate 74 has a protrusion 80 engageable with the groove 78. When torque required to turn the pulley 22 is below the threshold, the protrusion 80 remains engaged with the groove 78 to transmit rotation from the second clutch plate 74 to the first clutch plate 72. When torque required to turn the pulley 22 is above the threshold, the protrusion 80 slips out of the groove 78 and allows the second clutch plate 74 to rotate relative to the first clutch plate 72. As an example, the protrusion 80 and the groove 78 may include ramped surfaces 82 to allow for the slippage at torques above the threshold.

As another example, one of the first clutch plate 72 and the second clutch plate 74 may be spring-loaded, i.e., a spring 76 biases one of the first and second clutch plates 72, 74 toward the other of the first and second clutch plates 72, 74. In the example shown in the Figures, the spring 76 is between the shaft 66 and the first clutch plate 72 and biases the first clutch plate 72 toward the second clutch plate 74. The spring 76 may be, for example, a coil spring or any other suitable type of spring.

One of the pulley 22 and the motor 28 may have a splined bore 84, and the mechanical clutch 70 may include a splined shaft 86 fixed to one of the first clutch plate 72 and the second clutch plate 74 and slidably engaged with the splined bore 84. In other words, the splined shaft 86 rotates with the splined bore 84 and is slidable axially along the splined bore 84. The spring 76 is in the splined bore 84 and biases the splined shaft 86 away from the splined bore 84. In the example shown in the Figures, the pulley 22 has the splined bore 84 and the mechanical clutch 70 includes the splined shaft 86 fixed to the first clutch plate 72. The spring 76 biases the splined shaft 86 and the first clutch plate 72 in the splined bore 84 toward the second clutch plate 74.

When torque required to turn the pulley 22 is below the threshold the second clutch plate 74 transmits rotation to the first clutch plate 72. When torque required to turn the pulley 22 is above the threshold, the second clutch plate 74 forces the first clutch plate 72 toward the splined bore 84. As the first clutch plate 72 is forced toward the splined bore 84, the first clutch plate 72 overcomes the spring 76 and forces the splined shaft 86 farther into the splined bore 84, which allows the protrusion 80 and the groove 78 to disengage each other to allow relative rotation between the first clutch plate 72 and the second clutch plate 74. When torque required to turn the pulley 22 is reduced below the threshold, the spring 76 forces the protrusion 80 and the groove 78 into engagement with each other to again transmit rotation from the second clutch plate 74 to the first clutch plate 72.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A power steering assembly comprising:
   a housing having a first hole on a first axis;
   a cartridge in the first hole and having a second hole and a third hole that are both centered on a second axis that is parallel with and spaced from the first axis;

a pulley supported by the second hole and the third hole;
a motor releasably fixed to the cartridge and operatively coupled to the pulley; and
a slip clutch between the motor and the pulley.

2. The power steering assembly as set forth in claim 1, wherein the cartridge includes slots each extending along a circular arc about the first hole, and the cartridge is connected to the housing through the slots.

3. The power steering assembly as set forth in claim 2, further comprising fasteners extending through the slots and fixing the cartridge to the housing.

4. The power steering assembly as set forth in claim 2, wherein the cartridge includes a base and an extension extending from the base, the slots extending through the base, the third hole extending through the extension.

5. The power steering assembly as set forth in claim 1, wherein the cartridge includes a base and an extension extending from the base, the extension having a cylindrical outer surface spaced from the base.

6. The power steering assembly as set forth in claim 5, wherein the extension includes a cutout, and further comprising a belt extending through the cutout and engaged with the pulley.

7. The power steering assembly as set forth in claim 1, wherein the housing includes a first part having a passage elongated along a third axis, and a second part having a second passage elongated along the third axis.

8. The power steering assembly as set forth in claim 1, wherein the housing includes a first part having a lip defining a channel, and a second part disposed in the channel.

9. The power steering assembly as set forth in claim 1, wherein the slip clutch includes a first clutch plate rotationally fixed relative to the pulley, a second clutch plate rotationally fixed relative to the motor, and a spring biasing one of the first and second clutch plates toward the other of the first and second clutch plates.

10. The power steering assembly as set forth in claim 9, wherein the pulley has a splined bore and the slip clutch includes a splined shaft engaged with and axially slidable along the splined bore, the splined shaft being fixed to the first clutch plate, and the spring being in the splined bore and biasing the first clutch plate toward the second clutch plate.

11. The power steering assembly as set forth in claim 1, wherein the housing includes a first part defining the first hole and a second part having a belt guide.

12. The power steering assembly as set forth in claim 11, wherein the first part and the second part are sealed to each other.

13. The power steering assembly as set forth in claim 1, further comprising a rack operatively coupled to the pulley.

14. The power steering assembly as set forth in claim 13, further comprising a belt operatively coupling the rack to the pulley.

15. A power steering assembly comprising:
a housing having a first hole on a first axis;
a cartridge in the first hole and having a second hole and a third hole that are both centered on a second axis that is parallel with and spaced from the first axis;
a pulley supported by the second hole and the third hole;
a motor releasably fixed to the cartridge and operatively coupled to the pulley; and
the housing includes a first part having a lip extending perpendicular to the first axis and defining a channel, and a second part disposed in the channel.

16. The power steering assembly as set forth in claim 15, further comprising a mechanical clutch between the motor and the pulley, the mechanical clutch including: a first clutch plate rotationally fixed relative to the pulley, a second clutch plate rotationally fixed relative to the motor, and a spring biasing one of the first and second clutch plates toward the other of the first and second clutch plates.

17. The power steering assembly as set forth in claim 16, wherein the pulley has a splined bore and the mechanical clutch includes a splined shaft engaged with and axially slidable along the splined bore, the splined shaft being fixed to the first clutch plate, and the spring being in the splined bore and biasing the first clutch plate toward the second clutch plate.

18. The power steering assembly as set forth in claim 16, wherein the pulley has a splined bore and the mechanical clutch includes a splined shaft engaged with and axially slidable along the splined bore, the splined shaft being fixed to the first clutch plate, and the spring being in the splined bore and biasing the first clutch plate toward the second clutch plate.

19. A power steering assembly comprising:
a housing having a first hole on a first axis, the housing including a first part defining the first hole and a second part having a belt guide;
a cartridge in the first hole and having a second hole and a third hole that are both centered on a second axis that is parallel with and spaced from the first axis;
a pulley supported by the second hole and the third hole; and
a motor releasably fixed to the cartridge and operatively coupled to the pulley.

20. The power steering assembly as set forth in claim 19, wherein the first part and the second part are sealed to each other.

* * * * *